United States Patent
Cociglio et al.

(10) Patent No.: US 12,470,468 B2
(45) Date of Patent: Nov. 11, 2025

(54) PROCESSING OF PACKETS IN A PACKET-SWITCHED COMMUNICATION NETWORK

(71) Applicant: TELECOM ITALIA S.p.A., Milan (IT)

(72) Inventors: Mauro Cociglio, Turin (IT); Giuseppe Fioccola, Marigliano (IT)

(73) Assignee: TELECOM ITALIA S.p.A., Milan (IT)

( * ) Notice: Subject to any disclaimer, the term of this patent is extended or adjusted under 35 U.S.C. 154(b) by 365 days.

(21) Appl. No.: 17/785,317

(22) PCT Filed: Dec. 21, 2020

(86) PCT No.: PCT/EP2020/087383
§ 371 (c)(1),
(2) Date: Jun. 14, 2022

(87) PCT Pub. No.: WO2021/130148
PCT Pub. Date: Jul. 1, 2021

(65) Prior Publication Data
US 2023/0031183 A1 Feb. 2, 2023

(30) Foreign Application Priority Data
Dec. 23, 2019 (IT) .................. 102019000025405

(51) Int. Cl.
*H04L 43/026* (2022.01)
*H04L 43/08* (2022.01)
*H04L 45/7453* (2022.01)

(52) U.S. Cl.
CPC ............ *H04L 43/026* (2013.01); *H04L 43/08* (2013.01); *H04L 45/7453* (2013.01)

(58) Field of Classification Search
CPC ... H04L 43/026; H04L 43/08; H04L 45/7453; H04L 43/0829; H04L 43/0852;
(Continued)

(56) References Cited

U.S. PATENT DOCUMENTS

| | | | |
|---|---|---|---|
| 10,425,335 B2 * | 9/2019 | Bhattacharjee | H04L 9/3239 |
| 2019/0288924 A1 | 9/2019 | Cociglio | |
| 2020/0252315 A1 * | 8/2020 | Cociglio | H04L 43/026 |

FOREIGN PATENT DOCUMENTS

| | | | | |
|---|---|---|---|---|
| WO | WO-2017071779 A1 * | 5/2017 | | H04L 43/024 |
| WO | WO-2018072828 A1 * | 4/2018 | | H04L 43/024 |

OTHER PUBLICATIONS

RFC 5475 Techniques for IP Packet Selection (Mar. 2009) (Year: 2009).*
(Continued)

*Primary Examiner* — Charles C Jiang
*Assistant Examiner* — Margaret Marie Anderson
(74) *Attorney, Agent, or Firm* — Oblon, McClelland, Maier & Neustadt, L.L.P.

(57) ABSTRACT

An apparatus and associated method for processing packets transmitted in a packet-switched communication network includes a sampling module that identifies amongst the received packets a plurality of samples distributed in a statistically uniform way amongst at least two non-overlapping sample sequences. Each sample sequence is then subjected to at least one identification rule, thereby identifying in the sample sequence at least one sub-sequence of samples fulfilling the at least one identification rule. The identification rule comprises a condition on the value of at least one identification field of the packets. Then, at least one parameter indicative of a behavior of the at least one sub-sequence of samples is provided.

14 Claims, 3 Drawing Sheets

(58) Field of Classification Search
CPC ... H04L 43/106; H04L 41/142; H04L 43/024; H04L 63/101
See application file for complete search history.

(56) References Cited

OTHER PUBLICATIONS

International Search Report issued Mar. 2, 2021 in PCT/EP2020/087383 filed Dec. 21, 2020, 3 pages.
T. Zseby et al., "Sampling and Filtering Techniques for IP Packet Selection Status of This Memo", Network Working Group Request for Comments: 5475 Category: Standards Track, Mar. 2009, pp. 1-46.

* cited by examiner

PROCESSING OF PACKETS IN A PACKET-SWITCHED COMMUNICATION NETWORK

TECHNICAL FIELD

The present invention relates to the field of communication networks. In particular, the present invention relates to a method and apparatus for processing packets transmitted through a packet-switched communication network.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks.

Packet flows are typically subjected to performance measurements, which provide an indication of the quality of service (QoS) perceived by end users and allow detecting possible problems (e.g. failures or congestions) which may arise in the network. Such performance measurements may comprise packet loss measurements (namely, measurement of the number of packets lost in transmission between two points of the network) and/or time measurements, such as delay measurements (namely the time taken by packets to travel between two points of the network) or jitter measurements (namely measurement of the delay variations).

Performance measurements are typically based on performance parameters provided by a plurality of apparatuses (also termed herein after "measurement points") deployed in the network. Each measurement point identifies the packets of the packet flow to be measured and provides performance parameter(s) indicative of the individual behaviour of each identified packet (e.g. a timestamp) or the cumulative behaviour of the packet flow as a whole (e.g. a counter counting the number of detected packets or a cumulative or average timestamp). The performance parameters provided by the various measurement points are then properly correlated and processed to provide a performance measurement relating to the packet flow.

A packet flow may be defined by one or more values of one or more fields (or portions thereof) of its header (also termed "identification fields" herein after). For instance, in TCP/IP networks a point-to-point packet flow is typically defined by a certain combination of values of the Source Address field, Destination Address field, Protocol field, Source Port field, Destination Port field and DSCP field. A multipoint packet flow may instead be defined by a value (or a range of values) of anyone of the above fields (e.g. the Source Address field or the Destination Address field).

For being capable of identifying the packets of a certain packet flow to be measured, a measurement point shall be configured with an identification rule on the identification field(s) which define the packet flow. For example, if the packet flow is defined by a single value SA of the Source Address field, the identification rule which the measurement points shall apply to each received packet is Source Address=SA. If the condition expressed in the identification rule is satisfied, then the measurement point concludes that the received packet belongs to the packet flow to be measured. Then it performs an action, such as providing an individual performance parameter (e.g. a timestamp) relating to the identified packet, or updating a cumulative performance parameter (e.g. a counter or a cumulative or average timestamp) relating to the packet flow as a whole.

In most cases, several packet flows transmitted through the network shall be measured. Hence, the measurement points deployed in the network shall be configured with several identification rules, one for each packet flow to be measured.

The identification rules may be structured in an ordered list also called ACL (Access Control List). For example, if several packet flows shall be measured pertaining to different clients (where each client corresponds for example to a certain source address value SAm with m=1, 2, . . . . M), then an ACL shall be implemented comprising M identification rules, namely one identification rule for each source address value Source Address=SAm (with m=1, 2, . . . . M). The ACL technique provides that, for each received packet, the measurement point checks the identification rules sequentially, starting from the beginning of the list. When the condition defined by an identification rule is satisfied, the packet is identified as belonging to a certain packet flow and the consequent action is taken by the measurement point. The subsequent identification rules of the list are then ignored.

SUMMARY OF THE INVENTION

The Applicant has realized that the sequential approach of the ACL technique operates properly only if the identification rules in the list are mutually exclusive, namely if each received packet fulfils the condition expressed in at most one of the identification rules (the received packet could fulfil the condition expressed in none of the identification rules of the list, in which case the packet is discarded as it does not belong to any of the packet flows to be measured). This means that the packet flows which the ACL technique allows to properly identify must be separated or non overlapping, namely no one of their packets can belong to more than one packet flow to be measured at the same time.

In some cases, however, it may be desirable to provide performance measurements on at least partially overlapping packet flows, namely packet flows having at least part of their packets in common.

A first exemplary situation wherein the packet flows to be measured are at least partially overlapping is when a multilevel performance measurement on a packet flow is desired, namely when the network operator wishes to provide performance measurements for a certain packet flow (e.g. defined by a certain source address value SA) and its M sub-flows, each sub-flow being defined by the combination of source address value SA and respective destination address value DAm (with m=1, 2, . . . . M). In this case, each packet of the packet flow as a whole also belongs to one of the M packet sub-flows.

Applying the sequential approach of the ACL technique to an ordered list comprising a respective identification rule for the packet flow as a whole and for each sub-flow would not allow a proper identification of the packets. If the identification rule of the packet flow as a whole were the first one in the list, indeed, all its packets would be identified as belonging only thereto, the subsequent identification rules of the sub-flows being ignored. Conversely, if the identification rule of the packet flow as a whole were the last one in the list, no one of its packets would be identified as belonging thereto. In any case, no proper identification of all the packets belonging to each packet flow and sub-flow to be measured can be carried out and, hence, no accurate performance measurement may be provided for the packet flow and all its sub-flows.

In order to obviate this drawback, an ACL list comprising only the M mutually exclusive identification rules of the M sub-flows could be provided. In this case, the measurement points would provide performance parameters relating to the M sub-flows only. Hence, in order to provide performance parameters relating to the packet flow as a whole, an additional step would be required, namely combining or merging the performance parameters relating to the M sub-flows.

Another exemplary situation wherein the packet flows to be measured are at least partially overlapping is when multidimensional performance measurements are desired, e.g. per-client performance measurements and also per-CoS (Class of Service) performance measurements. It is assumed for example that each client corresponds to a certain source address value SAm (with m=1, 2, . . . . M) and each CoS corresponds to a certain value CoSz (with z=1, 2, . . . . Z) of the DSCP field (in particular, its 3 most significant bits). The M packet flows defined by the source address values SAm (with m=1, 2, . . . . M) are at least partially overlapping with the Z packet flows defined by the CoS values CoSz (with z=1, 2, . . . . Z), because a packet may have Source Address equal to anyone of the values SAm and at the same time DSCP field equal to anyone of the values CoSz.

Also in this case, applying the sequential approach of the ACL technique to an ordered list comprising a respective identification rule for each one of the packet flows to be measured would not allow a proper identification of all the packets belonging to each packet flow to be measured.

Also in this case, in order to obviate this drawback an ACL list comprising M×Z mutually exclusive identification rules could be provided, each identification rule being of the type Source Address=SAm AND DSCP=CoSz (with m=1, 2, . . . . M and z=1, 2, . . . . Z). If for example M=100 and Z=9, M×Z=900 identification rules shall be implemented, identifying M×Z non overlapping sub-flows. The measurement points would then provide performance parameters relating to such M×Z sub-flows. Hence, in order to provide per-client performance measurements and per-CoS performance measurements, a processing of these performance parameters shall be performed, by suitably combining or merging them on a per-client basis and on a per-CoS basis.

From the above examples, it is apparent that application of the ACL technique to scenarios where the packet flows to be measured are at least partially overlapping (e.g. multi-level measurements and multidimensional measurements) exhibits some drawbacks.

The sequential approach of the ACL technique indeed requires splitting the packet flows to be measured into non overlapping sub-flows identifiable by mutually exclusive identification rules. This may result in a large number of identification rules to be implemented.

Moreover, an additional step of suitably combining or merging the performance parameters relating to the identified sub-flows so as to provide performance measurements at the desired level(s) and/or in the desired dimension(s) is disadvantageously required.

In view of the above, the Applicant has tackled the problem of providing a method and apparatus (in particular, but not exclusively, a measurement point suitable for providing performance parameters for performance measurements) for processing packets in a packet-switched communication network which overcome the aforesaid drawbacks.

In particular, the Applicant has tackled the problem of providing a method and apparatus (in particular, but not exclusively, a measurement point suitable for providing performance parameters for performance measurements) for processing packets in a packet-switched communication network which is capable of providing an analysis of the behaviour (e.g. a performance measurement) of at least partially overlapping packet flows in a more efficient way from a computational point of view.

According to embodiments of the present invention, the above problem is solved by identifying amongst the received packets at least two sample sequences. The packets identified as samples are distributed in a statistically uniform way amongst the sample sequences, meaning that the probability that a received packet is identified as a sample of a sample sequence is the same for all the sample sequences. Then, each sample sequence is subjected to at least one identification rule comprising a condition on the value of at least one identification field of the packet (preferably, the packet header). This allows identifying, in each sample sequence, at least one sub-sequence of samples satisfying the condition expressed in the identification rule. In case of multiple identification rules applied to a same sample sequence, these rules may be mutually exclusive so that the identified sample sub-sequences are non overlapping. Then, for each sample sub-sequence at least one parameter is provided, which is indicative of the behavior of the sample sub-sequence. For example, an individual performance parameter (e.g. a timestamp) may be provided for each sample of the sub-sequence, or a cumulative performance parameter (e.g. a counter or a cumulative or average timestamp) for the sub-sequence as a whole may be provided, so as to enable a performance measurement on each sub-sequence.

Therefore, an analysis of the behaviour of at least partially overlapping packet flows (e.g. a multilevel or multidimensional performance measurement) may be advantageously performed, by identifying amongst all the received packets a number of sample sequences equal to the number of levels or dimensions to be investigated, and then by applying to each sample sequence at least one identification rule pertaining to a respective level or dimension.

This advantageously results in a reduced number of identification rules to be implemented. As described above in connection with the exemplary case of multidimensional performance measurements, indeed, the mere application of the ACL technique to all the incoming packets would require implementation of a list of M×Z identification rules. According to the invention, instead, amongst all the incoming packets two sample sequences (one for each dimension, namely client and CoS) are firstly identified; then one sample sequence is subjected to M mutually exclusive identification rules in the per-client dimension and the other sample sequence is subjected to Z mutually exclusive identification rules in the per-CoS dimension. This requires implementation of M+Z identification rules, which in general is much lower than M×Z. For example, if M=100 and Z=9, 109 identification rules are required instead of 900.

Furthermore, advantageously, no recombining or merging of the parameters provided for the sub-sequences is needed to provide an analysis of the traffic behavior at the desired level or in the desired dimension. By providing a sample sequence for each level or dimension to be investigated, indeed, the parameter(s) relating to the sub-sequence(s) obtained from each sample sequence already pertain to the desired level or dimension to be investigated. Hence, the parameter(s) may be used directly for providing an analysis of the traffic behaviour (e.g. a performance measurement) at the desired level or dimension, without the need to carry out any additional merging or combination operation.

The method of the invention is accordingly very efficient from the computational point of view.

It shall be noticed that, since the packets identified as samples are distributed in a statistically uniform way amongst the various sample sequences, the composition of each sample sequence statistically reflects the composition of the whole incoming traffic. Hence, subjecting each sample sequence to respective identification rule(s) advantageously provides sample sub-sequences whose behavior (e.g. in terms of performance, in particular packet loss, delay and jitter) statistically reflect that of corresponding packet flows and sub-flows which would be obtained by directly applying the same identification rule(s) to the whole incoming traffic. The parameters provided for each sample subsequence therefore statistically reflect the actual behaviour of the incoming traffic.

The method of the present invention is accordingly applicable not only to performance measurements but, more generally, also to any situation requiring a statistical analysis of the traffic.

According to a first aspect, the present invention provides a method for processing packets transmitted in a packet-switched communication network, the method comprising:
a) identifying amongst the packets a plurality of samples distributed in a statistically uniform way amongst at least two sample sequences;
b) subjecting each sample sequence to at least one identification rule thereby identifying in the sample sequence at least one sub-sequence of samples fulfilling the at least one identification rule, the at least one identification rule comprising a condition on the value of at least one identification field of the packets; and
c) providing at least one parameter indicative of a behaviour of the at least one sub-sequence of samples.

Preferably step a) includes identifying amongst the packets a plurality of samples distributed in a statistically uniform way amongst at least two non overlapping sample sequences.

According to an embodiment, at step a) the identifying is based on the values of a sampling signature calculated by applying a hash function to a predetermined mask of bits in each one of the packets, each one of the at least two sample sequences being associated with a respective possible value of the sampling signature.

According to a variant of such embodiment, at step a) the sampling signature is a portion of a hash calculated by applying the hash function, a length of this hash portion being dynamically and retroactively adjusted.

Preferably, step b) comprises subjecting at least one of the at least two sample sequences to a plurality of mutually exclusive identification rules, thereby providing a plurality of non-overlapping sub-sequence of samples.

Preferably, the plurality of mutually exclusive identification rules are applied to the at least one of the sample sequences sequentially, e.g. by an ACL technique.

Preferably, step b) comprises subjecting a first one of the at least two sample sequences to at least one first identification rule and subjecting a second one of the at least two sample sequences to at least one second identification rule, the at least one first identification rule and the at least one second identification rule being non mutually exclusive.

According to an embodiment, at step c) the at least one parameter comprises at least one cumulative parameter indicative of the behaviour of the at least one sub-sequence of samples as a whole.

In addition or alternatively, at step c) the at least one parameter may comprise at least one individual performance parameter indicative of the behaviour of a sample of the at least one sub-sequence.

According to a second aspect, the present invention provides an apparatus for a packet-switched communication network comprising:
a sampling module configured to identify amongst received packets a plurality of samples distributed in a statistically uniform way amongst at least two sample sequences;
at least two rule modules, each rule module being configured to subject a respective sample sequence to at least one identification rule thereby identifying in the sample sequence at least one sub-sequence of samples fulfilling the at least one identification rule, the at least one identification rule comprising a condition on the value of at least one identification field of the packets; and
at least two analysis modules, each analysis module being configured to provide at least one parameter indicative of a behaviour of the at least one sub-sequence of samples identified in a respective sample sequence.

Preferably, the sampling module is configured to identify amongst received packets a plurality of samples distributed in a statistically uniform way amongst at least two non overlapping sample sequences.

According to a third aspect, the present invention provides a computer program product comprising instructions which, when the program is executed by a computer, cause the program to carry out the steps of the method as set forth above.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
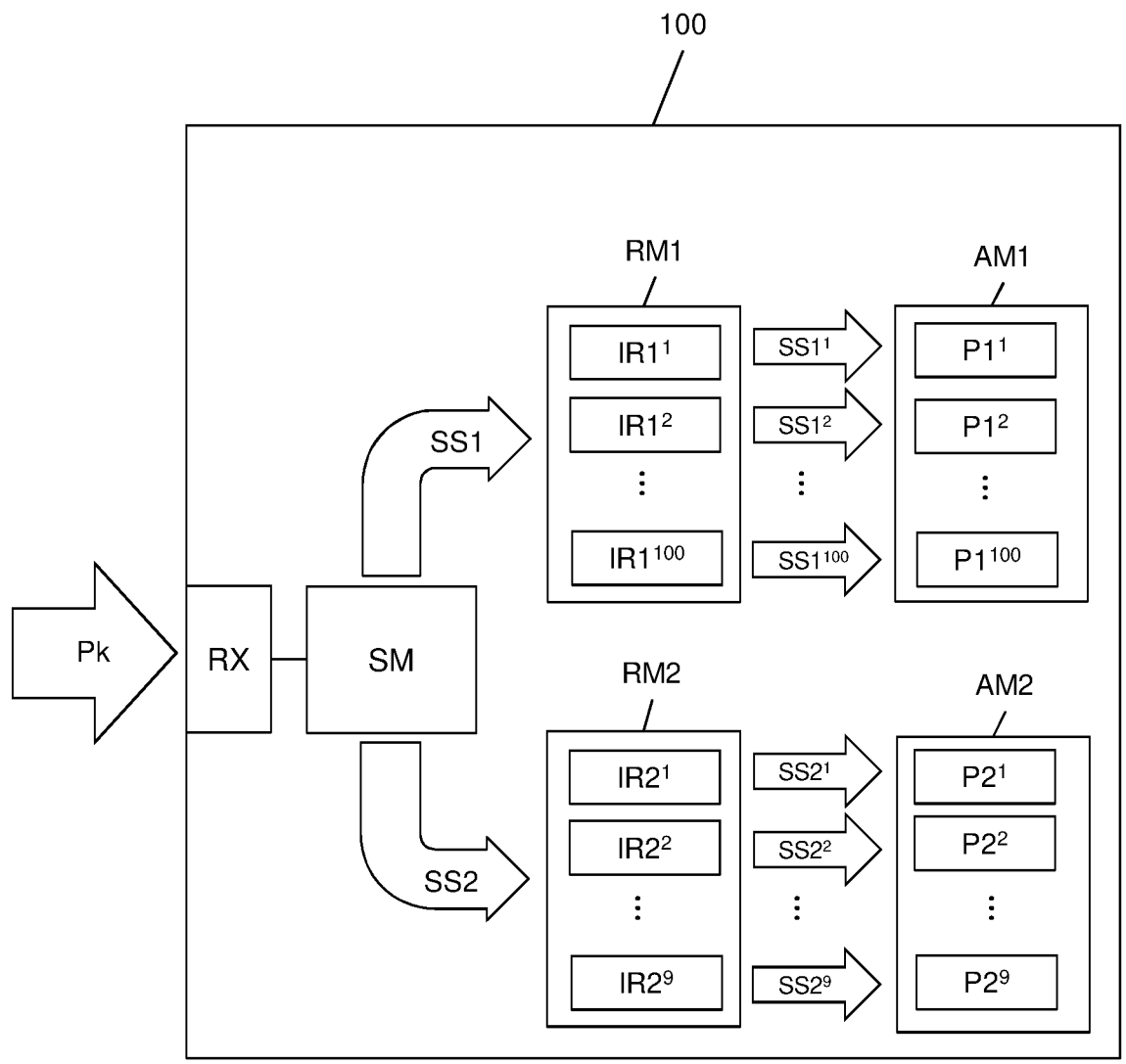
FIG. 1 schematically shows an apparatus for a packet-switched communication network, configured to process the received packets according to an embodiment of the present invention.

FIG. 1 schematically shows an apparatus 100 for a packet-switched communication network, configured to process packets Pk transmitted through the network according to an embodiment of the present invention.

The apparatus 100 may be implemented within a node (e.g. a switch or a router) of the packet switched communication network. Alternatively, the apparatus 100 may be a stand-alone apparatus located at a node or on a link between two nodes of the packet-switched communications network. The apparatus 100 for example may be part of a management network configured to perform management tasks (including performance measurements) on the packet-switched communication network. In that case, the apparatus 100 basically is a measurement point of the management network and is preferably connected to a management server (not shown in the drawings) configured to cooperate with it (e.g. to gather performance parameters therefrom) for performing the management tasks.

Preferably, each packet Pk transmitted through the network comprises a header and a payload. The payload comprises user data. Preferably, the header comprises information for routing the packet Pk through the network. The header format depends on the protocol according to which the packets Pk are formatted.

Figure 2:
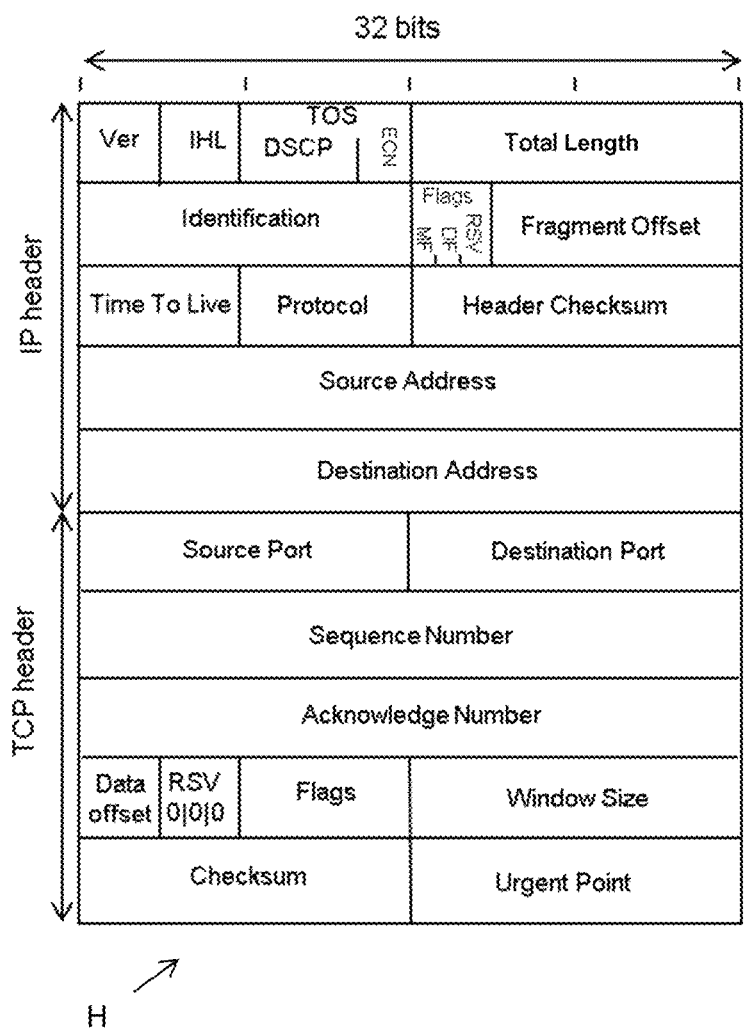
FIG. 2 schematically shows the structure of a packet transmitted in a packet-switched communication network.

By way of non limiting example, FIG. 2 shows the header H of a packet Pk formatted according to the known TCP (Transmission Control Protocol) over IPv4 (Internet Protocol Version 4). The header H comprises 40 bytes divided into 20 bytes for the IP header and 20 bytes for the TCP header. The TCP header in particular comprises the fields Source Port, Destination Port, Sequence Number, Acknowledge Number, Data Offset, RSV (reserved), Flags, Window Size, Checksum and Urgent Point.

Referring again to FIG. 1, the apparatus 100 preferably comprises a receiver RX, a sampling module SM, at least two rule modules RMk (k=1, 2, . . . ) and at least two analysis module AMk (k=1, 2, . . . ). All the modules of the apparatus 100 may be implemented by hardware, software or a combination thereof.

The receiver RX is preferably configured to receive a plurality of packets Pk transmitted through the packet-switched communication network.

The sampling module SM is preferably configured to identify amongst the received packets Pk a plurality of samples distributed in a statistically uniform way amongst at least two sample sequences. According to embodiments of the present invention, the at least two sequences of samples SSk (k=1, 2, . . . ) are identified based on values of a sampling signature calculated by applying a hash function to a predetermined mask of bits in each received packet Pk. As it will be described in detail herein below, each sample sequence SSk is associated with a respective possible value Hk of the sampling signature (also termed herein below "sampling value"). Hence, if the sampling signature of a packet Pk is equal to the sampling value Hk associated with a certain sample sequence SSk (which will statistically happen for several received packets, due to collisions of the hash function), then the packet Pk is assigned to that sample sequence SSk.

Each rule module RMk (k=1, 2, . . . ) is preferably configured to receive a respective sample sequence SSK (k=1, 2) from the sampling module SM and to apply thereto at least one identification rule IRk$^{nk}$ (nk=1, . . . ) comprising a condition on the value of at least one identification field of the packet Pk (preferably, the packet header). This allows identifying, in each sample sequence SSk, at least one sub-sequence of samples SSk$^{nk}$ (nk=1, . . . ) satisfying the condition expressed in the identification rule IRk$^{nk}$ (nk=1, . . . ).

Each analysis module AMk (k=1, 2, . . . ) is preferably configured to receive the at least one sub-sequence of samples SSk$^{nk}$ (nk=1, . . . ) identified in a respective sample sequence SSk (k=1, 2) and to provide, for each sample sub-sequence SSK$^{nk}$, at least one parameter Pk$^{nk}$ (nk=1, . . . ) indicative of the behavior of the sample sub-sequence SSk$^{nk}$. For example, an individual performance parameter (e.g. a timestamp) for each sample of the sub-sequence SSk$^{nk}$ and/or a cumulative performance parameter (e.g. a counter or a cumulative or average timestamp) for the sub-sequence SSk$^{nk}$ as a whole may be provided.

With reference to the flow chart of FIG. 3, the operation of the apparatus 100 according to an embodiment of the present invention will be described in detail.

As the measurement session begins, the receiver RX of the apparatus 100 preferably starts receiving the packets Pk (step 300).

For example, if the apparatus 100 is implemented at the receiving side of a node, the packets Pk are those received at one or more input ports of the node. If the apparatus 100 is implemented at the transmitting side of a node, the packets Pk are those transmitted by one or more output ports of the node. If instead the apparatus 100 is implemented on a link, the packets Pk are those transmitted along the link (in one direction or both, if the link is bidirectional).

If the apparatus 100 has a pass-through configuration (namely, the apparatus 100 is deployed on the path of real traffic transmitted in the packet-switched network), the packets Pk are the ones actually transmitted through the network. Otherwise, the packets Pk may be copies of the actually transmitted ones, for example generated by a mirroring technique.

As a packet Pk is received, the sampling module SM preferably calculates its sampling signature (step 301), by applying a predetermined hash function to a predetermined mask of bits in the packet Pk, preferably in the packet header.

The sampling signature calculated by the sampling module SM for the received packet Pk preferably has a statistically uniform distribution amongst its possible values, meaning that the probability that the sampling signature is equal to a certain value is the same for all its possible values. The sampling signature may be calculated e.g. as provided by T. Zseby et al. "Sampling and Filtering Techniques for IP Packet Selection", RFC 5475 March 2009. For example, the hash function may be the known IPSX (IP Shift-XOR) or the known BOB hash function.

Preferably, the mask of bits to which the hash function is applied depends on the packet format, namely on the protocol according to which the packets Pk are formatted. In order to ensure a statistically uniform distribution of the sampling signature amongst its possible values—and hence of the packets Pk amongst the sequences of samples SSk (k=1, 2, . . . )—the hash function is preferably applied to a mask of bits whose values are as entropic as possible amongst the packets Pk, meaning that the probability that different packets Pk have the bits of the selected mask with the same values is as low as possible. It is therefore preferable avoiding bits of header fields whose values are always or often the same, such as for instance the TCP port field whose value is often 80. For the same reason, if the apparatus 100 is located at an intermediate node of a tunnel carrying the packets Pk, the tunnel header shall be avoided, since the packets Pk have all the same tunnel header.

If a consistent identification of the sequences of samples SSk (k=1, 2, . . . ) at different apparatuses implemented in the network is desired, the hash function is preferably applied to a mask of bits whose values are invariant through the path of the packets Pk. This way, each apparatus applying the hash function to the mask of bits of a certain packet Pk will obtain the same sampling signature value for that packet. In this case it is therefore preferable avoiding bits of header fields whose values are changed at each node, such as for instance the TTL field and CheckSum of the IP header. If NAT (Network Address Translation) techniques are used, also the bits of the IP addresses shall be avoided.

For example, if the packets Pk are formatted according to the above mentioned TCP over IPv4 protocol, the mask of bits may comprise bits of one or more of the following fields: Identification, Flags, Fragment Offset, Source Address, Destination Address, Sequence Number and Total Length.

As it will be discussed in detail herein below, the sampling signature may be either the whole calculated hash or a portion thereof.

The sampling module SM then preferably compares the value of the calculated sampling signature with at least two predefined different sampling values Hk (k=1, 2, ... ), each sampling value being associated with a respective sample sequences SSk (k=1, 2 ... ) to be identified (step 302).

If the value of the calculated sampling signature is different from all the sampling values Hk (k=1, 2, ... ), then the sampling module SM preferably ignores the packet Pk and considers the next received packet Pk.

Otherwise, if the value of the calculated sampling signature is equal to one of the sampling values Hk (k=1, 2, ... ), the sampling module SM then preferably identifies the packet Pk as a sample of the sample sequence SSK associated with that sampling value (step 303). This way, by repeating steps 300-303 on each received packet Pk, the sampling module SM basically identifies amongst the received packets Pk at least two sample sequences SSk (k=1, 2, ... ). Within each sample sequence, all the samples have sampling signature equal to the sampling value Hk associated with that sequence. As the sampling values Hk are different for different sample sequences, each sample sequence will include only packets that are not included in the other sample sequence(s), accordingly the sample sequences will be mutually non overlapping.

It shall be noticed that, if several apparatuses similar to apparatus 100 are deployed on the path of the packets Pk and their sampling modules are all configured the same way (namely, same hash function, same mask of bits to which the hash function shall be applied and same sampling values Hk), all the apparatuses identify in the received packets Pk the same sample sequences (except possible packets losses or reception sequence errors involving the measurement samples).

Each sample sequence SSk (k=1, 2, ... ) identified by the sampling module SM is then forwarded to a respective rule module RMk (k=1, 2, ... ). Each rule module RMk preferably applies to the respective sample sequence SSk at least one identification rule IRk$^{nk}$ (nk=1, ... ) thereby identifying at least one sub-sequence of samples SSk$^{nk}$ (nk=1, ... ) (step 304).

Each identification rule IRk$^{nk}$ preferably comprises at least one condition on the value of at least one identification field of the packets Pk, preferably of the packet header.

When a rule module RMk receives a sample of its sequence SSK from the sampling module SM, at step 304 it preferably applies thereto its identification rule(s) IRk$^{nk}$. The rule module RMk concludes that a sample belongs to a sub-sequence SSk$^{nk}$ if the corresponding identification rule IRk$^{nk}$ is satisfied by the value(s) comprised in its relevant identification field(s).

In case a rule module RMk is configured to apply at least two identification rules IRk$^{nk}$ (nk=1, 2, ... ), such identification rules IRk$^{nk}$ are preferably mutually exclusive, so that the corresponding sample sub-sequences SSk$^{nk}$ are non overlapping. For example, the identification rules IRk$^{nk}$ applied by the rule module RMk may contain different, mutually exclusive conditions on the value(s) of a same identification field or combination of identification fields of the packet. This way, the identification rules IRk$^{nk}$ may be applied sequentially (e.g. according to the known ACL technique) by the rule module RMk.

On the other hand, the identification rule(s) applied by different rule modules RMk preferably pertain to different levels or dimensions of the traffic, so that they may be non mutually exclusive. For example, different rule modules RMk may apply identification rule(s) containing conditions on the value(s) of different identification fields or combinations of identification fields of the packet.

FIG. 1 shows an exemplary situation wherein the sampling module SM provides two sample sequences SS1 and SS2, identified based on two different values H1 and H2 of the sampling signature. As shown in FIG. 1, each sample sequence SS1, SS2 is sent to a respective rule module RA1, RA2.

The rule module RA1 applies e.g. 100 mutually exclusive identification rules IR1$^{n1}$ (n1=1, 2, ... 100) on the value of the Source Address field, each identification rule being of the type Source Address=SA$^{n1}$ (n1=1, 2 ... 100). This way, the rule module RA1 identifies 100 non overlapping sample sub-sequences SS1$n1$ (n1=1, 2, ... 100).

The rule module RA2 may instead apply e.g. 9 mutually exclusive identification rules IR2$^{n2}$ (n2=1, 2, ... 9) on the value of the DSCP field, each identification rule being of the type DSCP=CoSn2 (n2=1, 2 ... 9). This way, the rule module RA2 identifies 9 non overlapping sample sub-sequences SS2$^{n2}$ (n2=1, 2, ... 9).

Though the identification rules IR1$^{n1}$ and IR2$^{n2}$ are not mutually exclusive (a packet Pk may have both Source Address equal to anyone of the values SA$^{n1}$ and at the same time DSCP field equal to anyone of the values CoSn2), nonetheless the sub-sequences SS1$^{n1}$ (n1=1, 2 ... 100) do not overlap with the sub-sequences SS2$^{n2}$ (n2=1, 2, ... 9), because the rule modules RA1, RA2 operate on non overlapping sample sequences SS1, SS2.

As another example (not depicted in the drawings), the rule module RA1 could apply a single identification rule IR1$^{n1}$ (n1=1) e.g. on the value of the Source Address field, this identification rule being of the type Source Address=SA. This way, the rule module RA1 identifies a single sample sub-sequence SS1$^{n1}$ (n1=1).

The rule module RA2 could instead apply e.g. 100 mutually exclusive identification rules IR2$^{n2}$ (n2=1, 2, ... 100) on the values of the Source Address field and Destination Address field, each identification rule being of the type Source Address=SA AND Destination Address=DAn2 (n2=1, 2 ... 100). This way, the rule module RA2 identifies 100 non overlapping sample sub-sequences SS2$^{n2}$ (n2=1, 2, ... 100).

Though the identification rules IR1$^{n1}$ and IR2$^{n2}$ are not mutually exclusive (each packet Pk whose Source Address fulfils the identification rule IR1$^{n1}$ could also fulfil any of the identification rules IR2$^{n2}$), nonetheless the sub-sequence SS1$^{n1}$ does not overlap with the sub-sequences SS2$^{n2}$ (n2=1, 2, ... 100), because also in this case the rule modules RA1, RA2 operate on non overlapping sample sequences SS1, SS2.

Figure 3:
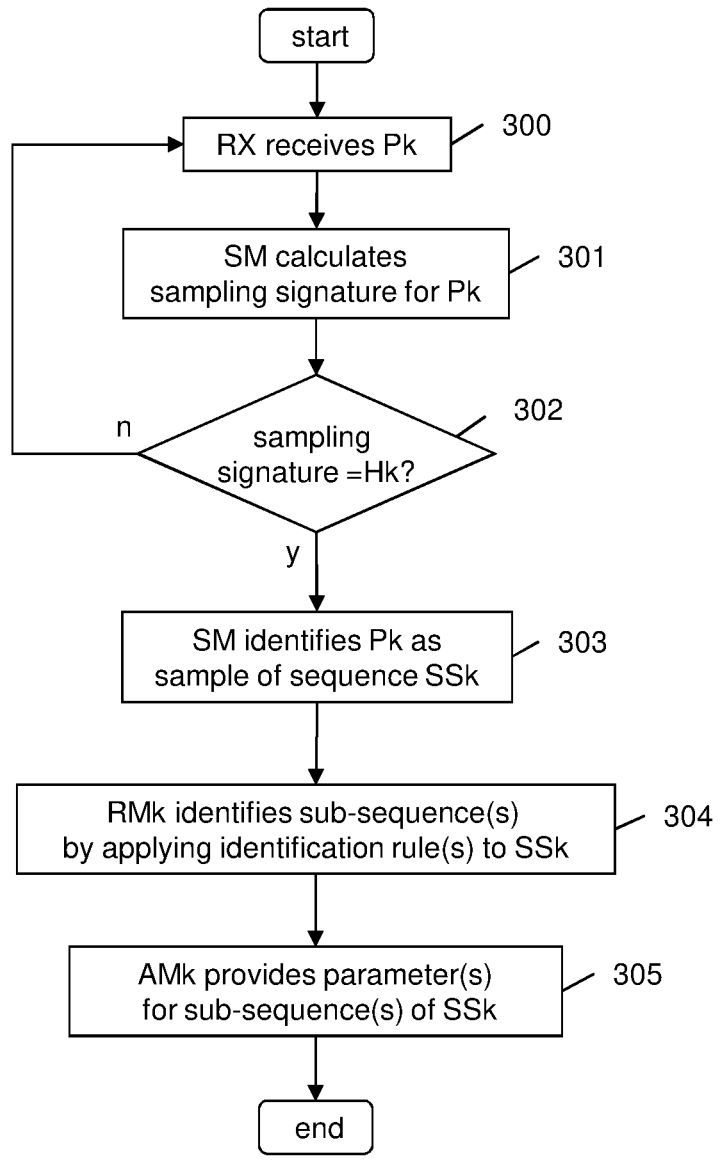
FIG. 3 is a flow chart of the operation of the apparatus in FIG. 1, according to an embodiment of the present invention.

Referring again to the flow chart of FIG. 3, each analysis module AMk (k=1, 2, ... ) preferably receives the at least one sub-sequence of samples SSk$^{nk}$ (nk=1, ... ) identified in a respective sample sequence SSk (k=1, 2, ... ) and provides, for each sample sub-sequence SSk$^{nk}$, at least one parameter Pk$^{nk}$ (nk=1, ... ) indicative of the behavior of the sample sub-sequence SSk$^{nk}$ (step 305).

For example, the parameter Pk$^{nk}$ provided for the sample sub-sequence SSk$^{hk}$ may comprise an individual performance parameter (e.g. a timestamp) for each sample of the sub-sequence $SSk^{nk}$, and/or a cumulative performance parameter (e.g. a counter or a cumulative or average timestamp) for the sub-sequence $SSk^{nk}$ as a whole.

With reference to the exemplary implementation of FIG. 1, the analysis module AM1 preferably receives the sub-sequences $SS1n1$ (n1=1, 2, ... 100) identified by the rule module RM1 in the sample sequence SS1, and provides at least one parameter $P1^{n1}$ (n1=1, 2, ... 100) for each sub-sequence $SS1n1$ (n1=1, 2, ... 100).

Similarly, the analysis module AM2 preferably receives the sub-sequences $SS2^{n2}$ (n2=1, 2, ... 9) identified by the rule module RM2 in the sample sequence SS2, and provides at least one parameter $P2^{n2}$ (n2=1, 2, ... 9) for each sub-sequence $SS2^{n2}$ (n2=1, 2, ... 9).

Such parameters $Pk^{nk}$ (k=1, 2, ... and nk=1, ...) may then be sent e.g. to a management server (not shown in the drawings), either periodically or at the end of the measurement session. The management server will then use them for performing a statistical analysis of the behaviour (e.g. a performance measurement, such as a packet loss measurement, a delay measurement or a jitter measurement) of each sample sub-sequence $SSk^{nk}$ (k=1, 2, ... and nk=1, ...).

Therefore, an analysis of the behaviour of at least partially overlapping packet flows (e.g. a multilevel or multidimensional performance measurement) may be advantageously performed, by identifying amongst all the received packets Pk a number of sample sequences SSk (k=1, 2, ...) equal to the number of levels or dimensions to be investigated, and then by applying to each sample sequence SSk at least one identification rule $IRk^{nk}$ pertaining to a respective level or dimension.

This advantageously results in a reduced number of identification rules to be implemented. As described above, indeed, the mere application of the ACL technique to all the incoming packets for providing performance measurements in e.g. 2 dimensions of the traffic (per-client and per-CoS) would require the implementation of a list of M×Z identification rules (M being the number of mutually exclusive rules in the per-client dimension and Z being the number of mutually exclusive rules in the per-CoS dimension). According to the invention embodiment, instead, amongst all the incoming packets Pk two mutually non overlapping sample sequences SS1, SS2 (one for each dimension, namely client and CoS) are firstly identified based on 2 different values of the sampling signatures; then one sample sequence SS1 is subjected to M mutually exclusive identification rules $IR1n1$ (n1=1, 2, .... M) in the per-client dimension and the other sample sequence SS2 is subjected to Z mutually exclusive identification rules $IR2^{n2}$ (N2=1, 2, .... Z) in the per-CoS dimension. This requires implementation of M+Z identification rules, which in general is much lower than M×Z. For example, if M=100 and Z=9, 109 identification rules are required instead of 900.

Furthermore, advantageously, no recombining or merging of the parameters $Pk^{nk}$ provided for the sub-sequences $SSk^{nk}$ is needed to provide an analysis of the traffic behavior at the desired level or in the desired dimension. By providing a sample sequence SSk for each level or dimension to be investigated, indeed, the parameter(s) $Pk^{nk}$ relating to the sub-sequence(s) $SSk^{nk}$ obtained from each sample sequence SSk already pertain to the desired level or dimension to be investigated. Hence, the parameter(s) $Pk^{nk}$ may be used directly for providing an analysis of the traffic behaviour (e.g. a performance measurement) at the desired level or dimension, without the need to carry out any additional merging or combination operation.

The method of the invention is accordingly very efficient from the computational point of view.

It shall be noticed that, since whether a packet Pk will be assigned to a certain sample sequence SSk depends on the value of its hash-generated sampling signature, it is not possible to know a priori which packets Pk will be part of each sample sequence SSk. However, use of the hash-calculated sampling signature distributed in a statistically uniform way amongst its possible values guarantees that the packets Pk identified as samples are distributed in a statistically uniform way amongst the various sample sequences SSK and, therefore, that the composition of each sample sequence SSK statistically reflects the composition of the whole incoming traffic.

Hence, subjecting each sample sequence SSk to respective identification rule(s) $IRk^{nk}$ advantageously provides sample sub-sequences $SSk^{nk}$ whose behavior (e.g. in terms of performance, in particular packet loss, delay and jitter) statistically reflect that of corresponding packet flows and sub-flows which would be obtained by directly applying the same identification rule(s) to the whole incoming traffic. The parameters $Pk^{nk}$ provided for each sample sub-sub-sequence $SSk^{nk}$ therefore statistically reflect the actual behaviour of the incoming traffic.

The method of the present invention is accordingly applicable not only to performance measurements but, more generally, also to any situation wherein a statistical analysis of the traffic is desired.

Though the embodiment described above provides for identifying the sample sequences based on the value of a hash-calculated sampling signature, this is not limiting. The sampling module SM may indeed distribute the packets amongst the sample sequences in a statistically uniform way by applying other techniques. For example, each time a packet is received the sampling module SM could generate a random number e.g. between 1 and 100, having a uniform probability density function. Then, if for example two sample sequences SS1, SS2 shall be identified, the sampling module SM may compare the random number with a threshold equal to 50. If the random number is lower than 50, the packet is assigned to the sample sequence SS1, otherwise it is assigned to the sample sequence SS2. The uniform density probability function of the random number ensures that the packets Pk are distributed between the sample sequences SS1, SS2 in a statistically uniform way. Differently from the hash-calculated sampling signature technique, the random number technique can not ensure that different apparatuses implemented on the path of the packets Pk perform a consistent identification of the sample sequences SS1, SS2. Hence, the random number technique may be applied when the statistical analysis of the traffic behaviour to be performed does not require combining or comparing parameters provided by different apparatuses.

According to a variant, the sampling module SM may also calculate an identification signature for each packet Pk identified as part of any sampling sequence SSk, as described by WO 2017/071779A1 in the name of the same Applicant. This allows to properly correlate performance parameters relating to a same sample and provided by different apparatuses, also in case of reception sequence errors involving samples of a same sub-sequence.

Further, as mentioned above, the sampling signature may be either the whole calculated hash or a portion thereof. In this latter case, the length of the hash portion used as sampling signature for the purpose of identifying the samples amongst the received packets Pk may be dynamically adjusted, as described by WO 2018/072828 A1 in the name of the sample Applicant. This allows controlling the number of samples by dynamically adapting the sampling rate to compensate possible fluctuations of the packet rate of the received packets Pk.

The invention claimed is:

1. A method for processing packets transmitted in a packet-switched communication network, said method comprising:
   a) identifying amongst said packets a plurality of samples distributed in a statistically uniform way amongst at least two sample sequences such that a probability that a received packet is identified as a sample of a sample sequence is the same for all the sample sequences;
   b) subjecting a first one of said at least two sample sequences to at least one first identification rule thereby identifying in said first one of said at least two sample sequences at least one first sub-sequence of samples fulfilling said at least one first identification rule, and subjecting a second one of said at least two sample sequences to at least one second identification rule thereby identifying in said second one of said at least two sample sequences at least one second sub-sequence of samples fulfilling said at least one second identification rule, said at least one first identification rule and said at least one second identification rule being non mutually exclusive, said at least one first identification rule and said at least one second identification rule comprising-a conditions on the value of at least one identification field of said packets; and
   c) providing at least one parameter indicative of a behaviour of one of said at least one first sub-sequence of samples or said at least one second sub-sequence of samples.

2. The method according to claim 1, wherein step a) includes identifying amongst the packets a plurality of samples distributed in a statistically uniform way amongst at least two non overlapping sample sequences.

3. The method according to claim 2, wherein at step a) said identifying is based on the values of a sampling signature calculated by applying a hash function to a predetermined mask of bits in each one of said packets, each one of said at least two sample sequences being associated with a respective possible value of said sampling signature.

4. The method according to claim 3, wherein at step a) said sampling signature is a portion of a hash calculated by applying said hash function to said predetermined mask of bits, a length of said portion being dynamically and retroactively adjusted.

5. The method according to claim 1, wherein step b) comprises subjecting said first one of said at least two sample sequences or said second one of said at least two sample sequences to a plurality of mutually exclusive identification rules, thereby providing a plurality of non-overlapping sub-sequence of samples.

6. The method according to claim 5, wherein said plurality of mutually exclusive identification rules are applied to said first one of said at least two sample sequences or to said second one of said at least two sample sequences sequentially.

7. The method according to claim 1, wherein at step c) said at least one parameter comprises at least one cumulative parameter indicative of the behavior of said one of said at least one first sub-sequence of samples or said at least one second sub-sequence of samples as a whole.

8. The method according to claim 1, wherein at step c) said at least one parameter comprises at least one individual performance parameter indicative of the behavior of a sample of said one of said at least one first sub-sequence of samples or said at least one second sub-sequence of samples.

9. An apparatus for a packet-switched communication network comprising:
   a sampling module configured to identify amongst received packets a plurality of samples distributed in a statistically uniform way amongst at least two sample sequences such that a probability that a received packet is identified as a sample of a sample sequence is the same for all the sample sequences;
   at least two rule modules, a first rule module of said at least two rule modules being configured to subject a first sample sequence of said at least two sample sequences to at least one first identification rule thereby identifying in said first sample sequence at least one first sub-sequence of samples fulfilling said at least one first identification rule, a second rule module of said at least two rule modules being configured to subject a second sample sequence of said at least two sample sequences to at least one second identification rule thereby identifying in said second sample sequence at least one second sub-sequence of samples fulfilling said at least one second identification rule, said at least one first identification rule and said at least one second identification rule being non mutually exclusive, said at least one first identification rule and said at least one second identification rule comprising conditions on the value of at least one identification field of said packets; and
   at least two analysis modules, each analysis module being configured to provide at least one parameter indicative of a behaviour of at least one of said at least one first sub-sequence of samples identified in said first sample sequence and said at least one second sub-sequence of samples identified in said second sample sequence.

10. The apparatus according to claim 9, wherein the sampling module is configured to identify amongst received packets a plurality of samples distributed in a statistically uniform way amongst at least two non overlapping sample sequences.

11. A non-transitory computer-readable medium comprising instructions which that when executed by a computer, cause the computer to perform the steps of the method according to claim 1.

12. The method according to claim 1, at step b)
   the at least one first identification rule pertains to a first identification field of a packet and the at least one second identification rule pertains to a second identification field of a packet.

13. The method according to claim 1, wherein step b) is distinct from step a) and intermediate between steps a) and c).

14. The method according to claim 5, wherein the plurality of mutually exclusive identification rules applied to said first one of said at least two sample sequences or to said second one of said at least two sample sequences pertain to a same identification field of a packet.

* * * * *